(12) United States Patent
Moquin

(10) Patent No.: US 7,327,840 B2
(45) Date of Patent: Feb. 5, 2008

(54) LOUDSPEAKER TELEPHONE EQUALIZATION METHOD AND EQUALIZER FOR LOUDSPEAKER TELEPHONE

(75) Inventor: Philippe Moquin, Kanata (CA)

(73) Assignee: Mitel Networks Corporation (CA)

( * ) Notice: Subject to any disclaimer, the term of this patent is extended or adjusted under 35 U.S.C. 154(b) by 383 days.

(21) Appl. No.: 10/186,305

(22) Filed: Jun. 26, 2002

(65) Prior Publication Data
US 2003/0039351 A1    Feb. 27, 2003

(51) Int. Cl.
H04M 1/00    (2006.01)
H04M 9/00    (2006.01)

(52) U.S. Cl. .................. 379/387.01; 375/229

(58) Field of Classification Search ............ None
See application file for complete search history.

(56) References Cited

U.S. PATENT DOCUMENTS 5,568,558 A * 10/1996 Ramm et al. .......... 381/94.4
6,011,853 A * 1/2000 Koski et al. ............ 381/56
6,560,332 B1 * 5/2003 Christensson et al. . 379/406.05
6,707,912 B2 * 3/2004 Stephens et al. ....... 379/406.08
6,738,481 B2 * 5/2004 Krasny et al. ......... 379/406.12

FOREIGN PATENT DOCUMENTS

| EP | 0 376 587 A2 | 7/1990 |
|---|---|---|
| EP | 0 767 570 A2 | 4/1997 |
| JP | 2001-197585 | 7/2001 |
| WO | WO 98/05150 A | 2/1998 |

* cited by examiner

Primary Examiner—Ramnandan Singh
(74) Attorney, Agent, or Firm—Beyer Weaver LLP

(57) ABSTRACT

An equalizer for a loudspeaker telephone includes a signal generator for generating a reference signal for broadcast by a loudspeaker of the loudspeaker telephone. A filter alters the frequency response of signals prior to broadcast by the loudspeaker. During set-up, a processor processes the reference signal picked up by a microphone remote from the loudspeaker that has been convolved with the acoustical response of the environment to determine coefficients for the filter that are necessary to compensate for the environment acoustics and applies the coefficients to the filter.

20 Claims, 4 Drawing Sheets

LOUDSPEAKER TELEPHONE EQUALIZATION METHOD AND EQUALIZER FOR LOUDSPEAKER TELEPHONE

FIELD OF THE INVENTION

The present invention relates generally to loudspeaker telephones and in particular to a method for equalizing the loudspeaker of a loudspeaker telephone. The present invention also relates to an equalizer for a loudspeaker telephone and to a loudspeaker telephone incorporating the same.

BACKGROUND OF THE INVENTION

Loudspeaker telephones are well known in the art and are used in different environments ranging from small confined rooms to large open conference rooms. The quality of the loudspeaker in a loudspeaker telephone has a direct impact on the effectiveness of telephonic communications, especially during multi-party conference calls and therefore, is of extreme importance.

Loudspeaker selection for loudspeaker telephones has in the past been based on the performance of the loudspeaker in an anechoic environment. Unfortunately, in reality as loudspeakers are produced variations between individual loudspeakers arise. Unless very strict quality control measures are taken, these variations in loudspeakers result in significant performance differences between loudspeaker telephones.

In addition to the above problem, the environment in which the loudspeaker telephone is placed has significant impact on the acoustic response of the loudspeaker. Typically electronic and acoustical enclosure equalization is incorporated into the loudspeaker telephone to account for room acoustics in a "typical" environment. Often however, the "typical" environment acoustics are very different from the actual environment acoustics. This of course can result in a loudspeaker telephone exhibiting poor performance. As will be appreciated, an improved method for equalizing loudspeaker telephones is desired.

It is therefore an object of the present invention to provide a novel method for equalizing the loudspeaker of a loudspeaker telephone. It is also an object of the present invention to provide a novel equalizer for a loudspeaker telephone and a loudspeaker telephone incorporating the same.

SUMMARY OF THE INVENTION

According to one aspect of the present invention there is provided in a loudpeaker telephone having a loudspeaker to broadcast signals and a filter to alter the frequency response of signals prior to broadcast, a method for determining filter parameters to take into account environment acoustics comprising the steps of:

picking up a reference signal that has been convolved with the acoustical response of the environment;

processing the convolved signal to determine coefficients for the filter that are necessary generally to compensate for the environment acoustics; and applying the coefficients to the filter.

In one embodiment, the reference signal is a noise signal that is self-windowing and periodic. In another embodiment, the reference signal is a far end aperiodic signal. The filter is a digital filter whose coefficients are set to zero prior to broadcast of the noise signal.

If desired, the generating, picking up, processing and applying steps can be performed once to set the coefficients of the digital filter or repeated.

Preferably, the processing step includes the steps of performing a Fast Fourier Transform on the convolved signal to determine the power response thereof; analyzing the power response to determine the desired filter characteristics; and then calculating the filter coefficients based on the desired filter characteristics. The processing step may be performed by a digital signal processor in the loudspeaker telephone or by a personal computer coupled to the loudspeaker telephone.

According to another aspect of the present invention there is provided an equalizer for a loudspeaker telephone comprising:

a signal generator for generating a reference signal for broadcast by a loudspeaker of said loudspeaker telephone;

a filter to alter the frequency response of signals prior to broadcast by said loudspeaker; and a processor for processing the reference signal picked up by a microphone remote from said loudspeaker that has been convolved with the acoustical response of the environment to determine coefficients for said filter that are necessary generally to compensate for environment acoustics, said processor applying said coefficients to said filter.

According to still yet another aspect of the present invention there is provided a loudspeaker telephone comprising:

a loudspeaker to broadcast signals;

a microphone to pick up signals;

a digital signal processor to process signals picked up by said microphone and to process signals conveyed to said loudspeaker for broadcast;

a controller coupled to said digital signal processor, said controller connecting said digital signal processor to a communications line to enable voice communications; and an equalizer to adjust the frequency response of signals broadcast by said loudspeaker generally to compensate for environment acoustics.

The present invention provides advantages in that the frequency response of signals broadcast by the loudspeaker of the loudspeaker telephone can be adjusted to compensate for environment acoustics. Should the environment acoustics change, the equalizer can easily be re-calibrated.

BRIEF DESCRIPTION OF THE DRAWINGS

Embodiments of the present invention will now be described more fully with reference to the accompanying drawings in which.

DETAILED DESCRIPTION OF THE PREFERRED EMBODIMENTS

Figure 1:
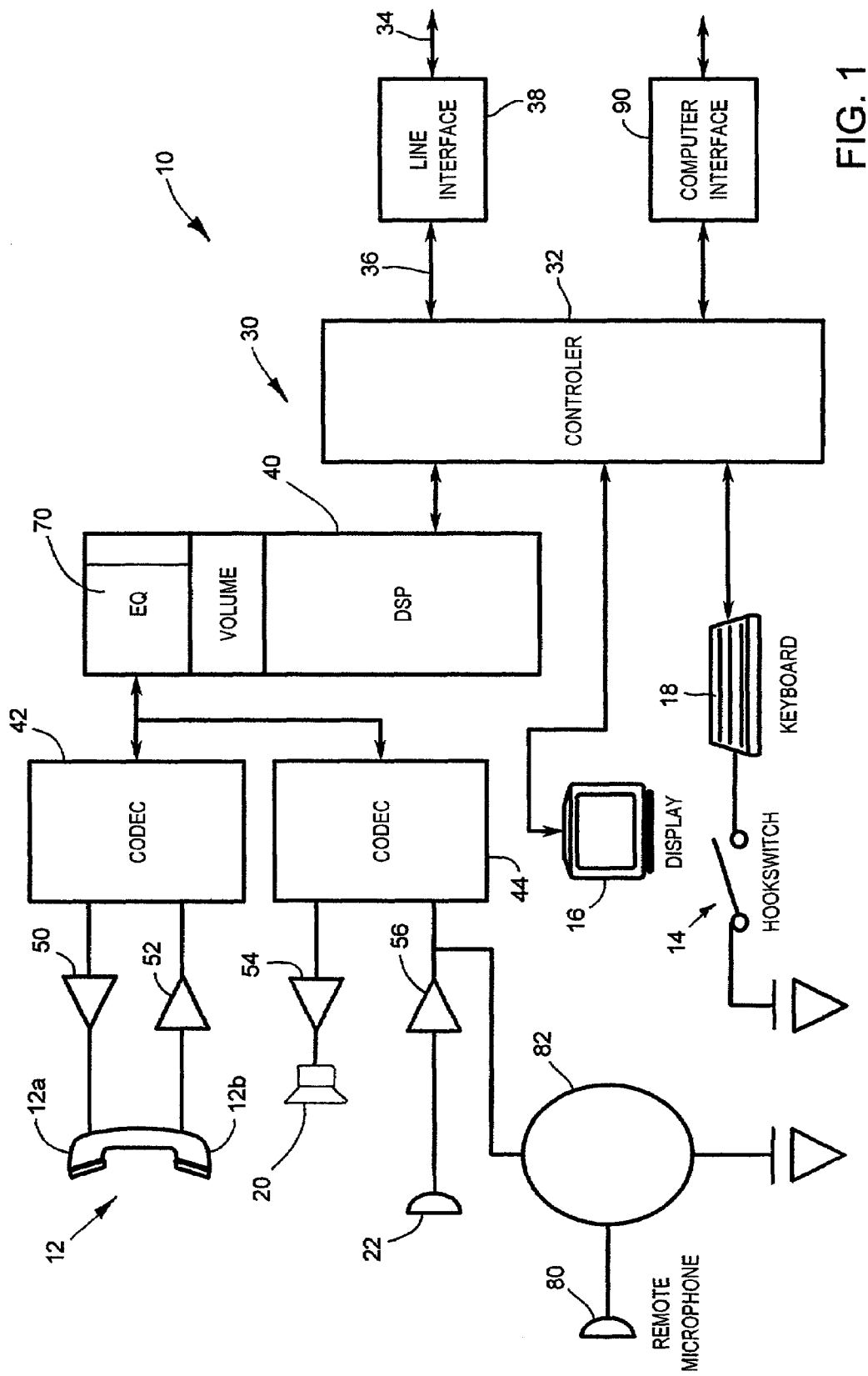
FIG. 1 is a schematic diagram of a loudspeaker telephone including an equalizer in accordance with the present invention.

Turning now to FIG. 1, a loudspeaker telephone, commonly referred to as a "speakerphone", is shown and generally identified by reference numeral 10. Loudspeaker telephone 10 includes a housing (not shown) with a cradle that accommodates a handset 12 having a speaker 12a and a microphone 12b. A hookswitch 14 is associated with the cradle. A display 16 and a keyboard 18 are provided on the housing. A loudspeaker 20 and a microphone 22 are also provided to enable "hands-free" calls to be carried out.

Disposed within the housing are the loudspeaker telephone electronics generally identified by reference number 30. As can be seen, the loudspeaker telephone electronics 30 include a controller 32 coupled to a communications line 34 via an audio bus 36 and a line interface 38. The communications line 34 and the line interface 38 can either be analogue public switched telephone network (PSTN), digital time-division multiplexed (TDM), wireless, packet switched (e.g. VoIP, ATM) or any other voice carrier line or wireless interface.

A digital signal processor (DSP) 40 communicates with the controller 32 and with a pair of coder/decoders (Codecs) 42 and 44. Codec 42 is coupled to the speaker 12a and the microphone 12b of the handset 12 via amplifiers 50 and 52 respectively. Codec 44 is coupled to the loudspeaker 20 and the microphone 22 via amplifiers 54 and 56 respectively. The DSP 40 provides volume control, hands-free functionality, tone generation, equalization and other necessary functionality for the operation of the loudspeaker telephone 10. The controller 32 communicates with the display 16 and the keyboard 18, and connects either one or both voice channels of the loudspeaker telephone to the line interface 38.

Figure 2:
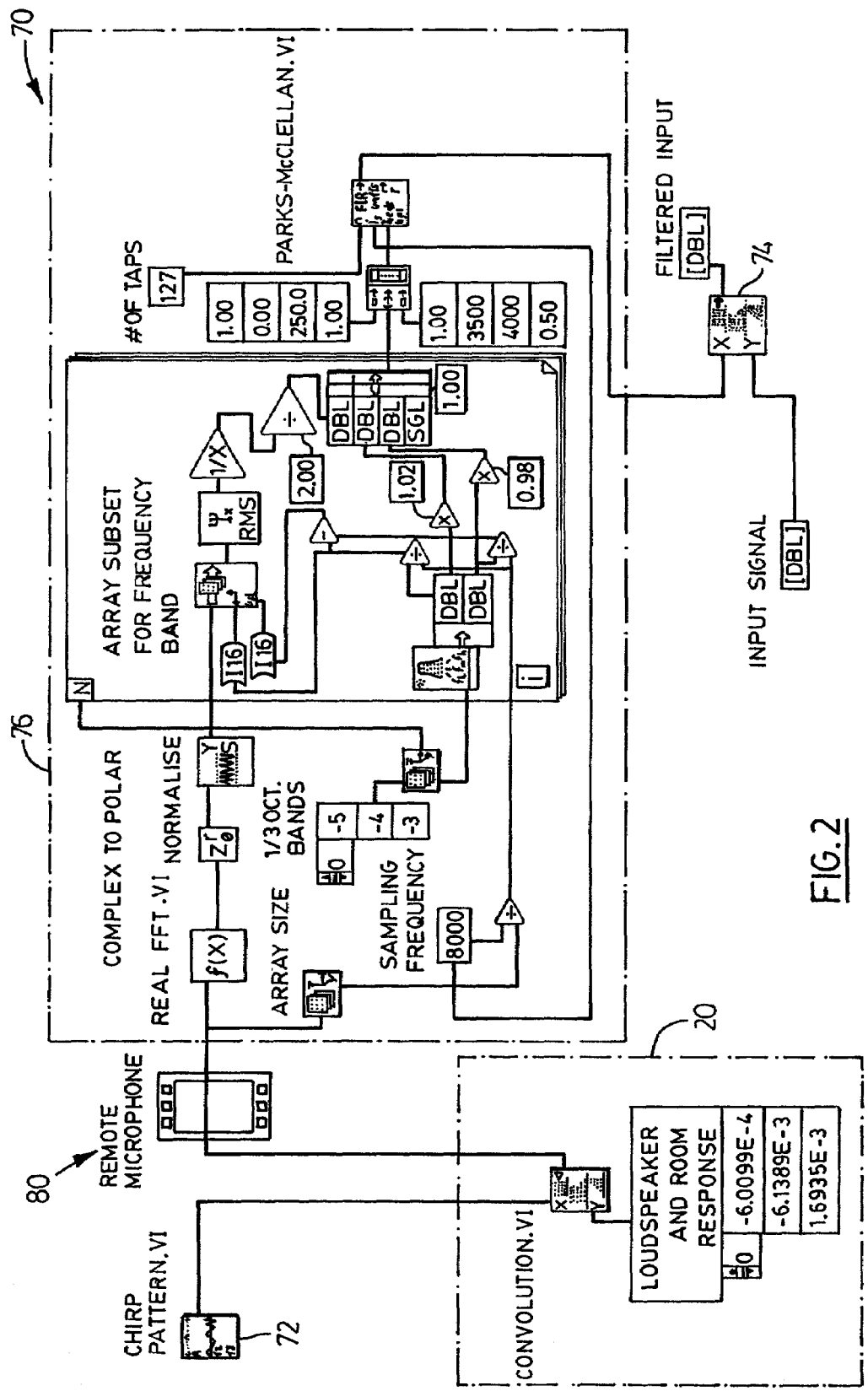
FIG. 2 is a schematic diagram of the equalizer illustrated in FIG. 1.

The loudspeaker telephone electronics 30 also include an equalizer 70 (best seen in FIG. 2). Equalizer 70 includes a signal generator 72, a digital filter 74 and an equalization program 76 executed by the DSP 40. Equalization program 76 calculates filter coefficients for the digital filter 74 when the loudspeaker telephone 10 is in an equalization set-up mode as will be described.

During set-up, a remote microphone 80 is plugged into a microphone jack 82 provided in the housing and is positioned at a preferred listening location spaced from the housing (i.e. a user's typical ear position). The loudspeaker telephone 10 is conditioned to the equalization set-up mode by pressing a predetermined sequence of keys on the keyboard 18 and/or a soft key or keys presented on the display 16. Once the loudspeaker telephone 10 enters the equalization set-up mode, the DSP 40 executes the equalization program 76, resulting in the coefficients of the digital filter 74 being set to zero. The DSP 40 also conditions the signal generator 72 to generate a reference signal. In this particular embodiment, the reference signal is a self-windowing, periodic random noise signal. The random noise signal is conveyed to the loudspeaker 20 and broadcast.

As the random noise signal is broadcast, the random noise signal is convolved with the acoustical response of the environment in which the loudspeaker telephone 10 is located. The convolved noise signal is picked up by the remote microphone 80 and is sampled by the Codec 44. The equalization program 76 executed by the DSP 40 in turn analyzes the convolved noise signal sampled by the Codec 44. Specifically, the equalization program 76 performs a Fast Fourier Transform (FFT) on the convolved noise signal to calculate the power response of the convolved noise signal. The power response is then modified by applying frequency response corrections to take the acoustics of the remote microphone 80 into account. The modified power response is then analyzed to determine the characteristics of the digital filter 74 that are necessary to compensate for the environment acoustics. The equalization program 76 in turn calculates the filter coefficients for the digital filter 74 using an appropriate algorithm such as Parks-McClellan. The equalization program 76 then applies the calculated filter coefficients to the digital filter 74 and stores the calculated filter coefficients in flash read only memory (ROM) to complete the equalization set-up mode.

With the filter coefficients of the digital filter 74 set, when the loudspeaker telephone 10 is conditioned to the hands-free mode, the digital filter 74 alters the frequency response of signals conveyed to the loudspeaker 20 for broadcast to take into account the environment acoustics. If the position of the loudspeaker telephone 10 is changed, the above process can be performed again to adjust the filter coefficients of the digital filter 74.

If desired, a personal computer executing the equalization program 76 can be used in conjunction with the loudspeaker telephone 10. In this case, the personal computer (not shown) is connected to the loudspeaker telephone 10 via a computer interface 90 as shown in FIG. 1. The computer interface 90 may be an RS-232, USB, Ethernet, Bluetooth or other suitable port. When the personal computer is coupled to the loudspeaker telephone 10, the convolved random noise signals picked up by the remote microphone 80 that are sampled by the Codec 44 are conveyed by the controller 32 to the personal computer via the computer interface 90 for processing. The filter coefficients calculated by the personal computer are then downloaded to the loudspeaker telephone 10 and stored in the flash ROM of the digital filter 74. The extra processing power of the personal computer permits the random noise signal broadcast, pickup and filter coefficient calculation steps to be repeated multiple times before ending the equalization set-up mode. Also, if a personal computer is used, a graphical user interface (GUI) can display graphically the response of the loudspeaker telephone before and after equalization. User controls can also be displayed such as "bass boost" to allow a user to adjust manually the filter coefficients.

Although the DSP 40 and the controller 32 are shown as separate components, the DSP 40 and the controller 32 may be incorporated into a single physical device. Also, although the signal generator 72 is described as generating a self-windowing, periodic random noise signal, the signal generator 72 can in fact generate any known signal.

Figure 3:
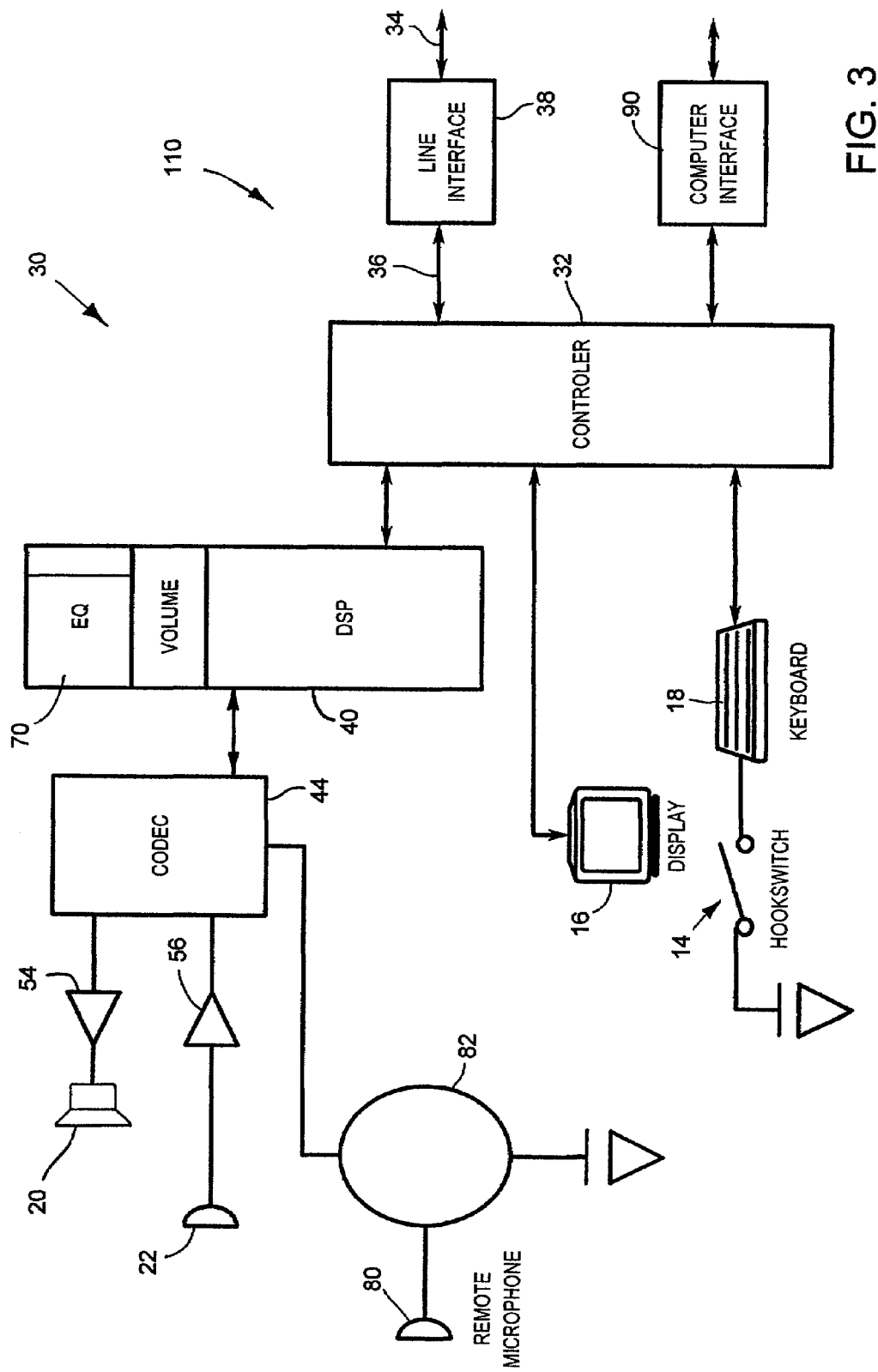
FIG. 3 is a schematic diagram of an audio conferencing unit including an equalizer in accordance with the present invention.

Turning now to FIG. 3, a loudspeaker telephone in the form of an audio conferencing unit is shown and is generally identified by reference numeral 110. As can be seen, the audio conferencing unit is very similar to the loudspeaker telephone 10 except that the handset 12 and associated circuitry are removed. The audio conferencing unit 110 however functions basically in the same manner as loudspeaker telephone 10.

If the DSP 40 has sufficient processing power, the loudspeaker telephone 10 can be programmed to enter the equalization set-up mode automatically during time periods when only far end sound is being broadcast by the loudspeaker 20 (i.e. no near end sound exists). This enables the filter coefficients to be dynamically calculated. In order to achieve this, it is first necessary to determine the background noise in each frequency band so that an estimate can be made as to when sufficient signal exists to make a valid estimate. Since the energy source is a far end signal it is deterministic but it is known. Thus, time is required before there is sufficient energy in all frequency bands of interest to make a valid measurement. Speech covers the band of frequencies adequately to provide suitable results within an acceptable period of time. Since this is an adaptive system, some equalization can be provided in frequency bands that have enough signal to noise before all frequencies of interest have received enough signal.

Figure 4:
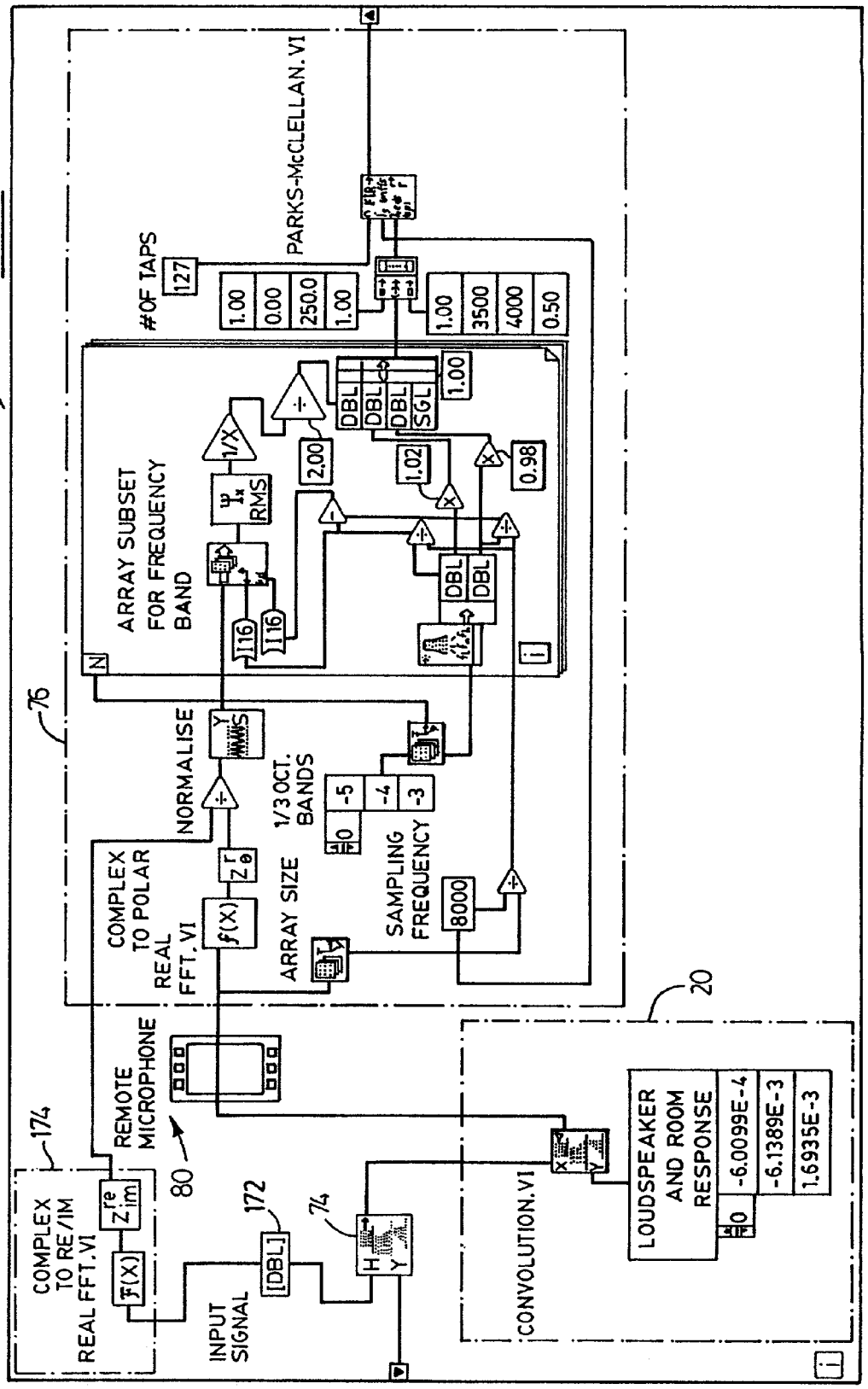
FIG. 4 is a schematic diagram of an alternative embodiment of an equalizer in accordance with the present invention.

FIG. 4 illustrates an embodiment of an equalizer for a loudspeaker telephone designed to calculate dynamically the filter coefficients and is generally identified by reference numeral 170. In this embodiment, the equalizer 70 is adaptive and includes a delay 172 and an additional FFT block 174. In this configuration, the reference signal is the receive (far end) signal and to account for the aperiodic nature of this signal, both FFT blocks are preceded by a windowing function. Further specifics concerning adaptive signal processing are available in many standard texts such as Widrow & Stearns.

Although preferred embodiments of the present invention have been described, those of skill in the art will appreciate that variations and modifications may be made without departing from the spirit and scope thereof as defined by the appended claims.

What is claimed is:

1. In a loudspeaker telephone having a loudspeaker to broadcast signals and a filter to alter the frequency response of signals prior to broadcast, a method for determining filter parameters to take into account environment acoustics of a given environment comprising the steps of:
   picking up a reference signal at a location in said environment remote from said loudspeaker telephone that has been convolved with the acoustical response of said environment, wherein said reference signal is a far end aperiodic signal;
   processing the convolved signal to determine coefficients for the filter that are necessary generally to compensate for the environment acoustics; and
   applying the coefficients to the filter prior to broadcast of signals from said loudspeaker in said environment,
   wherein processing of said convolved signal is delayed until a given predetermined value of energy exists therein in frequency bands of interest.

2. The method of claim 1 wherein said reference signal is broadcast by said loudspeaker.

3. The method of claim 2 wherein said reference signal is a noise signal.

4. The method of claim 3 wherein said noise signal is a self-windowing, periodic noise signal.

5. The method of claim 2 wherein said filter is a digital filter and wherein the coefficients of said digital filter are set to zero prior to broadcast of said reference signal.

6. The method of claim 2 wherein said picking up, processing and applying steps are repeated while said reference signal is being broadcast.

7. The method of claim 1 wherein said processing step includes the steps of:
   performing a Fast Fourier Transform on the convolved signal to determine the power response thereof;
   analyzing the power response to determine the desired filter characteristics; and
   calculating the filter coefficients based on the desired filter characteristics.

8. The method of claim 7 wherein the calculating step is performed using the Parks-McClellan algorithm.

9. The method of claim 7 wherein said processing step is performed by a digital signal processor in said loudspeaker telephone.

10. The method of claim 7 wherein said processing step is performed by a personal computer coupled to said loudspeaker telephone.

11. An equalizer for a loudspeaker telephone comprising:
    a signal generator for generating a reference signal for broadcast by a loudspeaker of said loudspeaker telephone in a given environment, wherein said reference signal is a far end aperiodic signal;
    a filter to alter the frequency response of signals prior to broadcast by said loudspeaker in said environment; and
    a processor for processing the reference signal picked up by a microphone remote from said loudspeaker telephone that has been convolved with the acoustical response of said environment to determine coefficients for said filter that are necessary generally to compensate for environment acoustics of said environment, said processor applying said coefficients to said filter,
    said processor being inhibited from processing said convolved signal until a given predetermined value of energy exists therein in frequency bands of interest.

12. An equalizer according to claim 11 wherein said filter is a digital filter and includes flash memory for storing said coefficients.

13. An equalizer according to claim 11 wherein said processor performs a Fast Fourier Transform on the convolved signal to determine the power response thereof; analyzes the power response to determine the desired filter characteristics; and calculates the filter coefficients based on the desired filter characteristics.

14. An equalizer according to claim 13 wherein said processor is a digital signal processor in said loudspeaker telephone.

15. An equalizer according to claim 13 wherein said processor is a personal computer coupled to said loudspeaker telephone.

16. An equalizer according to claim 11 wherein said signal generator generates a self-windowing, periodic noise signal.

17. A loudspeaker telephone comprising:
    a loudspeaker to broadcast signals in a given environment;
    a microphone remote from said loudspeaker telephone to pick up signals in said environment;
    a digital signal processor to process signals picked up by said microphone and to process signals conveyed to said loudspeaker for broadcast in said environment;
    a controller coupled to said digital signal processor, said controller connecting said digital signal processor to a communications line to enable voice communications;
    an equalizer to adjust the frequency response of signals broadcast by said loudspeaker generally to compensate for environment acoustics of said environment, and
    a processor that is enabled during periods when no signals are being broadcast by said loudspeaker, when enabled said processor processing a picked up far end aperiodic signal that has been convolved with the acoustical response of the environment to determine coefficients for said filter that are necessary generally to compensate for environment acoustics, said processor applying said coefficients to said filter,
    wherein said processor is inhibited from processing said convolved signal until a given predetermined value of energy exists therein in the frequency bands of interest.

18. A loudspeaker telephone according to claim 17 wherein said equalizer is programmable during periods when no signals are being broadcast by said loudspeaker.

19. A loudspeaker telephone according to claim 18 wherein said equalizer includes a filter to alter the frequency response of signals prior to broadcast by said loudspeaker.

20. A loudspeaker telephone according to claim 19 wherein said processor performs a Fast Fourier Transform on the convolved signal to determine the power response thereof; analyzes the power response to determine the desired filter characteristics; and calculates the filter coefficients based on the desired filter characteristics.

* * * * *